United States Patent [19]

Horiuchi et al.

[11] Patent Number: 5,422,834
[45] Date of Patent: Jun. 6, 1995

[54] SIMULATION METHOD AND SYSTEM FOR SIMULATING DRIVE MECHANISM

[75] Inventors: Toshihiko Horiuchi, Ushiku; Masaki Nakagawa, Ibaraki; Masatsugu Kametani, Tsuchiura; Takao Konno, Ibaraki, all of Japan

[73] Assignee: Hitachi, Ltd., Tokyo, Japan

[21] Appl. No.: 118,206

[22] Filed: Sep. 9, 1993

Related U.S. Application Data

[63] Continuation-in-part of Ser. No. 908,167, Jul. 2, 1992.

[30] Foreign Application Priority Data

Jul. 2, 1991 [JP] Japan ............................ 3-161379
Sep. 9, 1992 [JP] Japan ............................ 4-240366

[51] Int. Cl.[6] ............................................. G06G 7/12
[52] U.S. Cl. ........................................................ 364/578
[58] Field of Search .................. 73/668, 665, 662, 663, 73/804, 806, 767, 772, 775, 781, 664, 666, 667; 364/508, 578

[56] References Cited

U.S. PATENT DOCUMENTS

| | | | |
|---|---|---|---|
| 4,181,026 | 1/1980 | Abstein, Jr. et al. | 73/665 |
| 4,453,407 | 6/1984 | Sato et al. | 364/508 |
| 4,989,158 | 1/1991 | Sloane | 364/508 |
| 5,012,428 | 4/1991 | Ueno et al. | 364/508 |
| 5,156,370 | 10/1992 | Silcox et al. | 73/668 |

OTHER PUBLICATIONS

K. Takanashi, et al., "Japanese Activity on On–Line Testing", J. of Engineering Mechanics, ASCE, vol. 113, 1987, pp. 1014–1028.
R. W. Clough, "Dynamics of Structures", McGraw-Hill Kogakusha, Ltd., 1982, pp. 575–578.
C. P. Price, "Space automation and robotics", Aerospace America, p. 851 (no month), 1992.

*Primary Examiner*—Emanuel T. Voeltz
*Assistant Examiner*—Thomas Peeso
*Attorney, Agent, or Firm*—Antonelli, Terry, Stout & Kraus

[57] ABSTRACT

In place of a controlled object structure, a reaction force simulating actuator is connected to an actuator controlling the structure for recording a displacement at the connecting point. A reaction force at the connecting point after a given period of time is calculated by a digital computer on the basis of the measured value of the displacement and so forth and a known external force. The reaction force simulating actuator is actuated to realize the reaction force calculated value after the given period of time. Accordingly, since a load substantially corresponding to the reaction force from the controlled object structure is provided to a drive device, a test of the controlling drive device to be used in a condition difficult to realize can be performed under substantially similar conditions as in actual usage.

20 Claims, 12 Drawing Sheets

SIMULATION METHOD AND SYSTEM FOR SIMULATING DRIVE MECHANISM

CROSS REFERENCE TO THE RELATED APPLICATION

This application is a Continuation-in-Part application of U.S. patent application Ser. No. 07/908,167, entitled METHOD AND SYSTEM FOR VIBRATION TEST, filed by T. Horiuchi, et al., on Jul. 2, 1992. The contents of the above-identified U.S. patent application are herein incorporated by reference.

BACKGROUND OF THE INVENTION

The present invention relates to a method and a system for simulating a structural system including a drive mechanism or a controlling drive mechanism. More particularly, the invention relates to a method and a system for simulating a structural system including a drive mechanism or a controlling drive mechanism suitable for when testing of a controlled object is difficult due to the large length and/or size of the object or where an expected use environment for the object is difficult to simulate.

K. Takanashi, et al., "Japanese Activity on ON-Line Testing", J. of Engineering mechanics, ASCE. Vol. 113, 1987, pp. 1014–1028 discloses an excitation test and a numerical calculation through an on-line computer test.

R. W. Clough, "Dynamics of Structures", McGraw-Hill Kogakusha, Ltd., 1982, pp. 575–578 discloses excitation of a structure and an equation of motion.

A drive mechanism constituting of an actuator and a control unit therefore has been added to a structure in order to control position, velocity, acceleration and so forth on one or more points on the structure. Designing of a control system for the drive mechanism is analytically performed using dynamic characteristics of a controlled object structure, as well as the capacity and dynamic characteristics of the drive mechanism.

However, when the characteristics of the drive mechanism are different from those of a model for analysis, it is possible that a control requirement cannot be satisfied. Therefore, it is necessary to evaluate the performance of the drive mechanism, namely whether a targeted control can be achieved.

Conventionally, a performance evaluation test for the drive mechanism set forth above has been performed by actually constructing the controlled object structure, or the model of the structure and a controlled drive mechanism and by applying an expected external force and so forth to the controlled object structure.

However, when the structure of the controlled object has a large length and/or huge size, such as a high-rise building and so forth and when the controlling drive mechanism is an active mass damper, it has been difficult to evaluate the performance of the damper by a whole structure test before constructing the building.

On the other hand, when the use environment of the controlled object structure and the controlling drive mechanism is difficult to realize, such as weightlessness in space very high pressure at large depths under sea level, or so forth, the evaluation of the performance of the drive mechanism has been difficult. Also, simulation of the overall structure including the structure of the controlled object and the drive mechanism is equally difficult.

C. P. Price, "Space automation and robotics", AEROSPACE AMERICA, page 851 has introduced a technology for performing a test for a spacial structure on the earth.

The above-mentioned prior art is disadvantageous that it is difficult to implement the performance evaluation test for the controlling drive mechanism when the controlled object structure is difficult to be actually realized for a large length and/or huge size, or when the use environment cannot be realized. Also, the evaluation of performance of the overall structural system has been difficult.

SUMMARY OF THE INVENTION

It is an object of the present invention to provide a simulation method and system for evaluating performance of a controlling drive mechanism by evaluating dynamic characteristics of the overall system even when usage conditions, including a testing object structure, of the controlling drive mechanism are difficult to realize.

Another object of the invention is to provide a simulation method which can perform simulation for the overall structural system.

A further object of the invention is to provide a simulation method and apparatus for reproducing equivalent usage conditions without using the actual controlled object structure or model thereof. It should then be convenient to make possible simulation for an actuator for a large structure in a space without using the actual structure per se.

According to the present invention, in place of a controlled object structure, one or more first actuators for simulating reaction force from the controlled object structure to a controlling drive mechanism are provided. One or more second actuators, which are a part of the controlling drive mechanism, connected to the first actuators are controlled by a control device. At least one of displacement, velocity and acceleration is measured as the actuating condition of the first actuator. Using the measured value, a computer estimates a reaction force to be applied to the drive device from the controlled object structure, after a given period of time for measurement, employing a preliminarily input numerical model of the controlled object structure. A control signal is then output for realizing the calculated reaction force by the first actuator after the given period of time.

The first and second actuators are fixed to a reaction wall, namely a rigid wall or base oriented to have the same actuating direction.

On the other hand, simulation of performance of the overall structural system can be achieved by simultaneously calculating the response of the numerical model portion by the computer.

Also, the controlled object structure to be established as the numerical model can be a part of the controlled object structure. In this case, an actual model is used for the remaining portion and the first actuator is provided at the boundary between the numerical model and the actual model.

A simulation system, according to the present invention, for a drive mechanism provided on a controlled object structure comprises the drive mechanism controlling displacement, velocity and/or acceleration at one or more points on the structure providing one or more actuators connected to the drive mechanism via a boundary between the drive mechanism and the controlled object structure; a control device for the actuator(s), a computer to which a numerical model of the structure is input; and a device for measuring the actuating condition of the one or more actuators, and inputting the measured value of the measuring device to the computer, estimating a load to be generated at the boundary after a given period of time for measuring the measured value by the computer using the numerical model and outputting the control signal to a control device of the actuator for realizing the estimated load after the given period of time is repeated.

A simulation method, according to the invention, for a drive mechanism controlling displacements, velocities and/or accelerations at one or more points of a controlled object structure, being provided on the structure, comprises the steps of providing an actuator other than the drive mechanism at the boundary point between the structure, on which the drive mechanism is to be provided, and the drive mechanism; measuring the actuating condition of the actuator; inputting the measured value to a computer; the computer estimating a load to be generated at the boundary after a given period employing a numerical model input thereto and using measured values of displacement, velocity and/or acceleration; inputting a control signal to be output from a computer to a control device for the actuator; and repeating outputting of the control signal to the control device for the actuator for realizing the estimated load after a given period of time for measuring the measured values.

The simulation system and method of the structural system, according to the invention, includes a controlled object structure and a drive mechanism for controlling displacement, velocity and/or acceleration at one or a plurality of points of the structure. Therein, in one or more actuators are provided at one or more boundaries between the structure and the drive mechanism to provide the drive mechanisms with a control signal output from a computer, to which a numerical model of the structure is input. The control signal is input to a control device for the actuator. A measured value of the actuating condition of the actuator is input to the computer so that a load to be generated after a given period from the time for measuring the measured value is estimated for outputting the control signal to the control device for the actuator in order to realize the estimated load after the given period of time.

The following are preferred components of the present invention.

(1) A known external force term is included in calculation of the load using the numerical model.
(2) A load measuring is added for measuring the reaction force from the drive mechanism generated at the fixed point of the drive mechanism. The measured value is input to the computer so that the measured value of the load is used in addition to the displacement, velocity and acceleration as the actuating condition of one or more actuators and as the known external force term for estimating the load after the given period.
(3) A controlling feedback signal, obtained from the controlled object structure or measuring device provided thereon while the drive mechanism is in use, is calculated by the computer and output to the drive mechanism.
(4) The drive mechanism is provided on the actual model of a part of the controlled object structure and the remaining part of the controlled object structure is established as the numerical model, and one or more actuators are provided at the boundary between the actual model and the numerical model.
(5) The values to be controlled by the drive mechanism are the rotational angle, angular velocity and/or angular acceleration of the controlled object structure. The values to be measured as the actuating condition of the actuator are the rotational angle, angular velocity and/or the angular acceleration, and torque is calculated by the computer and realized by the associated actuator.
(6) The computer is a digital computer.
(7) The digital computer includes an A/D converter and a D/A converter, and transfer of data between the digital computer and other equipment is performed in the form of analog signal input and output via the A/D converter or the D/A converter.
(8) In (6) and (7), the digital computer is a parallel computer having at least two CPUs, in which at least one CPU estimates the load after the given period of time, and at least one of other CPUs calculates a control signal for one or more actuators, in parallel, and an interval for deriving the actuator control signal is shorter than or equal to an interval for deriving the load signal.
(9) In (8), the parallel computer has a memory accessible by a plurality of CPUs, wherein at least one CPU estimates the load after the given period of time and stores the results of the load estimation in the memory, and at least one of other CPUs calculates a control signal for the second actuator with reference to the results of estimation in the memory, in parallel,
(10) In any one of (6) to (9), the digital computer has a data storage memory, calculates motion of the controlled object structure in conjunction with estimation of the load, and stores the calculated value in the memory so that process can take place after testing.
(11) In (10), the digital computer inputs the signal relating to the drive mechanism through the A/D converter and stores it in the memory together with the estimated value of load and the calculated value of motion.
(12) In any one of (6) to (9), the digital computer externally outputs the calculated value at every given interval at a given timing to realize the calculated value.
(13) In (12), the calculated value is output as an analog signal via the D/A converter.

With means set forth above, since an equivalent reaction force can be applied to the drive mechanism, the performance evaluation test can be performed without actually providing the controlled object structure to the drive mechanism.

On the other hand, even when the use environment per se is difficult to realize, it becomes possible to perform simulation for evaluating performance under the expected use condition in consideration of the environmental condition in the numerical model input to the computer and numeric calculation, Similarly, it becomes possible to simulate the overall structural system

BRIEF DESCRIPTIONS OF THE DRAWINGS

DESCRIPTION OF THE PREFERRED EMBODIMENT

The preferred embodiments of the present invention will be discussed hereinafter with reference to the accompanying drawings.

Figure 1:
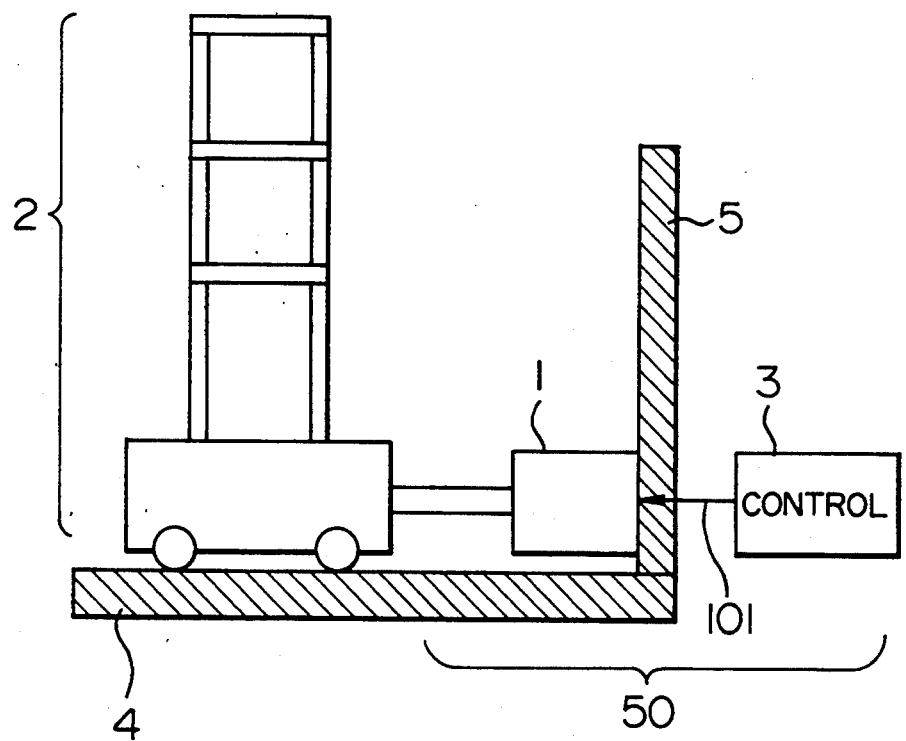
FIG. 1 is a diagrammatic illustration showing one example of a relationship between a controlling drive mechanism and a controlled object structure.

FIG. 1 diagrammatically illustrates a condition, in which a controlled object structure 2 is controlled by a drive mechanism 50 comprising a driving actuator or a drive device 1 and a control unit 3 therefor.

The actuator 1 is mounted on a reaction wall 5. On the other hand, the controlled object structure 2 is supported on a foundation 4 by its own weight. The control unit 3 inputs a drive signal 101 to the actuator 1.

Figure 2:
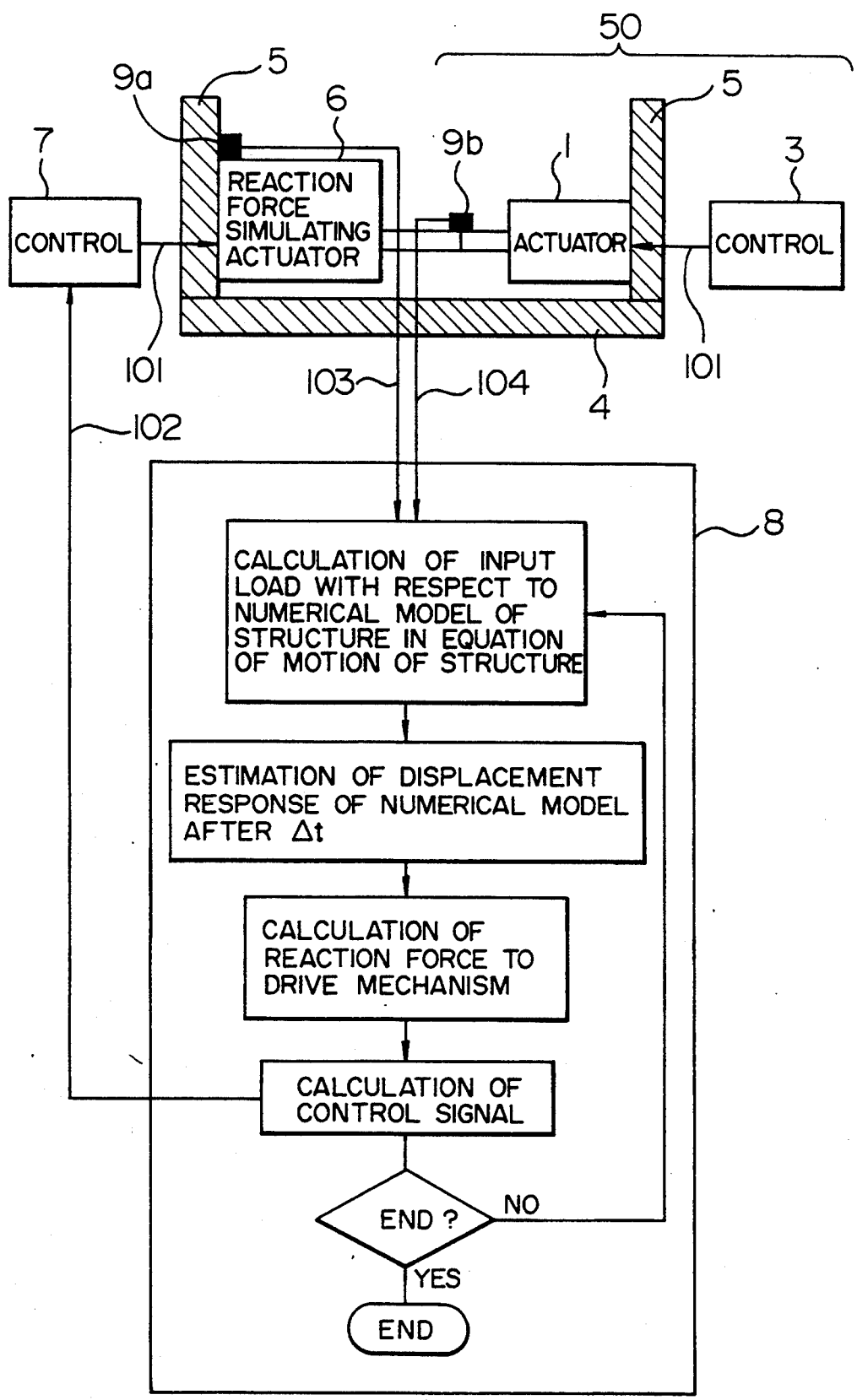
FIG. 2 is an illustration showing a construction and a flow diagram of the first embodiment a drive mechanism simulation system according to the invention.

In the shown embodiment, in order to perform performance simulation for a drive mechanism 50 under the condition of FIG. 1, equipment is constructed as illustrated in FIG. 2. Namely, in place of a controlled object structure 2, a reaction force simulating actuator 6 fixed to a reaction wall 5 is connected to a driving actuator 1. The reaction force simulating actuator 6 is controlled by the drive signal 101 from its control unit 7 and a control signal 102 which is supplied from a computer 8.

To the computer 8, a numerical model of the controlled object structure 2 is input. The computer 8 also receives measured values 103 and 104 (velocity measured value is not shown) of, respectively, an actuator center axis displacement measuring equipment 9a, an actuator axis connecting portion acceleration measuring equipment 9b or a velocity measuring equipment (not shown) at every regular timings. With the above-mentioned numerical model, a reaction force acting on the driving actuator from the controlled object structure 2 after a given time in the measured time period is estimated on the basis of the measured values and data of an external force active on the controlled object structure 2. Then, the control signal is output to the control unit 7 so that a reaction force is realized after the given regular period. The algorithm therefor will be described later.

It should be noted that the computers 9a and 9b are not always required to be placed at the shown positions. Also, the controlling drive device 1 is not limited to one device as shown but can comprise a plurality of drive devices. In the latter case, the actuators 6 simulating the reaction forces for respective drive devices should be provided. Also, the drive device 1 is not limited to be constructed with the actuator and its control unit, but can be constructed with other devices.

According to the shown embodiment, the reaction force from the controlled object structure 2 can be simulated by the actuator 6 so that the performance of the controlling drive device can be evaluated without using the actually constructed structure.

The calculation of the reaction force as set forth above can be calculated through the following manner.

The equation of motion of the controlled object structure can be expressed in the following manner by a finite element method, for example.

$$\hat{M}\ddot{w} + \hat{C}\dot{w} + \hat{K}w = L \tag{1}$$

wherein w: an absolute displacement vector
$\hat{M}$: a mass matrix
$\hat{C}$: a damping matrix
$\hat{K}$: a stiffness matrix
$L$: an external force vector Here, the displacement vector can be expressed separately for nodal points where the drive devices are provided and for other nodal points as well.

In the foregoing embodiment, since the displacement for nodal points where the drive devices are provided becomes known by measurement, it will be referred to as the "known vector". On the other hand, since the displacement of the other nodal points cannot be determined without calculation, it will be referred to as the "unknown vector". The separated expression is as follow:

$$w = \begin{Bmatrix} w_u \\ w_k \end{Bmatrix} \quad (2)$$

wherein
- $w_k$: displacement vector at the nodal point where the drive device(s) is provided (known vector)
- $w_u$: displacement vector at other points (unknown vector)

Accordingly with this, the mass, damping and stiffness matrices and the external force vector can be separately expressed as follow:

$$\left. \begin{aligned} \hat{M} &= \begin{bmatrix} M_u & M_{uk} \\ M_{uk}^T & M_k \end{bmatrix} \\ \hat{C} &= \begin{bmatrix} C_u & C_{uk} \\ C_{uk}^T & C_k \end{bmatrix} \\ \hat{K} &= \begin{bmatrix} K_u & K_{uk} \\ K_{uk}^T & K_k \end{bmatrix} \\ L &= \begin{Bmatrix} L_u \\ L_k \end{Bmatrix} \end{aligned} \right\} \quad (3)$$

Using this expression, the equation of motion concerning the unknown vector can be expressed:

$$M_u \ddot{w}_u + C_u \dot{w}_u + K_u w_u = L_u - M_{uk} \ddot{w}_k - C_{uk} \dot{w}_k - K_{uk} w_k \quad (4)$$

Consideration is given for solving this equation of motion for every given interval $\Delta t$. By expressing the value at a time $t_i$ with a suffix i, the following formula can be established to show that a sum of an inertia force, a damping force and a restoring force is equal to the external force.

$$M_u \ddot{w}_{ui} + C_u \dot{w}_{ui} + K_u w_{ui} = q_i \quad (5)$$

wherein $q_i = L_{ui} - M_{uk}\ddot{w}_{ki} - C_{uk}\dot{w}_{ki} - K_{uk}w_{ki}$ In the vector q; the term of the external force vector is known and the acceleration, velocity and displacement vectors become known by measurement. It should be noted that, among respective reaction forces, one that is very small in comparison with others can be ignored. In such a case, a vibration response to the reaction force to be ignored is not required to be measured.

Since the right side is known as seen from the foregoing equation (5), the vibration response at a timing $t_{i+1}$ after the given regular interval $\Delta t$ can be calculated. There should be various methods for calculating the vibration response at the time $t_{i+1}$. The following shows a manner for solving the equation by a central difference method.

At first, the foregoing equation (5) is modified as the following equation (6):

$$M\ddot{x}_i + C\dot{x}_i + Kx_i = q_i \quad (6)$$

wherein $M = M_u$
$C = C_u$
$K = K_u$
$x = w_u$

The acceleration vector and the velocity vector are approximated assuming that the acceleration is constant in the period between time $t = t_i - \Delta t$ and $t = t_i + \Delta t$. Then, the following equations are established.

$$\left. \begin{aligned} \dot{x}_i &= \frac{x_{i+1} - x_{i-1}}{2\Delta t} \\ \ddot{x}_i &= \frac{x_{i+1} + x_{i-1} - 2x_i}{\Delta t^2} \end{aligned} \right\} \quad (7)$$

Solving the equation (6) with respect to the displacement vector at the time $t_{i+1}$ by substituting the equation (6) with (7), the following equation (8) can be obtained.

$$x_{i+1} = \left( M + \frac{\Delta t}{2} C \right)^{-1} \left\{ M(2x_i - x_{i-1}) + \frac{\Delta t}{2} C x_{i-1} - \Delta t^2 (K x_i - q_i) \right\} \quad (8)$$

It should be noted that there are various methods for numerical calculation as set forth above, and thus the method other than central difference method can be employed. Namely, any method which can calculate the unknown vector at the time $t_{i+1}$ from the foregoing equation (6) can be employed.

Here, the foregoing equation (4) can be modified with respect to the known vector as expressed by the following equation (9).

$$L_k = M_{uk}^T \ddot{w}_u + C_{uk}^T \dot{w}_u + K_{uk}^T w_u + M_k \ddot{w}_k + C_k \dot{w}_k + K_k w_k \quad (9)$$

This external force vector is nothing but the load applied to the controlled object structure from the drive device. Accordingly, the reaction force to be applied to the actuator 1 of the drive mechanism by the actuator 6 simulating the reaction force is the force corresponding to the external force but having reversed plurality.

In the foregoing equation (9), the terms concerning the unknown vector are obtained through numerical calculation. On the other hand, the terms concerning the known vector can be determined by extrapolating the past data or other ways. Therefore, from the known information at the time $t_i$, the reaction force at a time $t_{i+1}$ can be calculated. Therefore, the above-mentioned embodiment can be implemented.

The flow of the simulation employing the shown method will be discussed with reference to FIG. 2. The measured values 103 and 104 from the measuring equipments 9a and 9b are input the computer 8. Then, the input load is calculated through the foregoing equation (5). Using the results of calculation, the response of the numerical model at $\Delta t$ later is calculated through equations (7) and (8). Using the result of this calculation, the reaction force applied to the drive mechanism is calculated through the equation (9) for calculating the control 102 to output to the control unit 7.

Accordingly, simulation of the drive mechanism becomes possible, and, in conjunction therewith, simulation of the overall structure system becomes possible.

Figure 3:
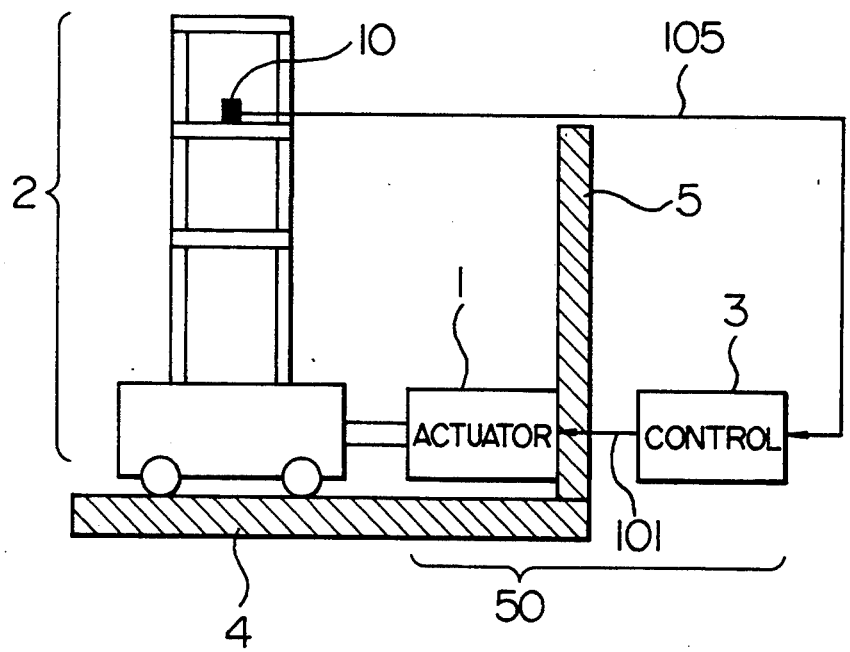
FIG. 3 is a diagrammatic illustration showing another example of a relationship between a controlled drive mechanism and a controlled object structure.
Figure 4:
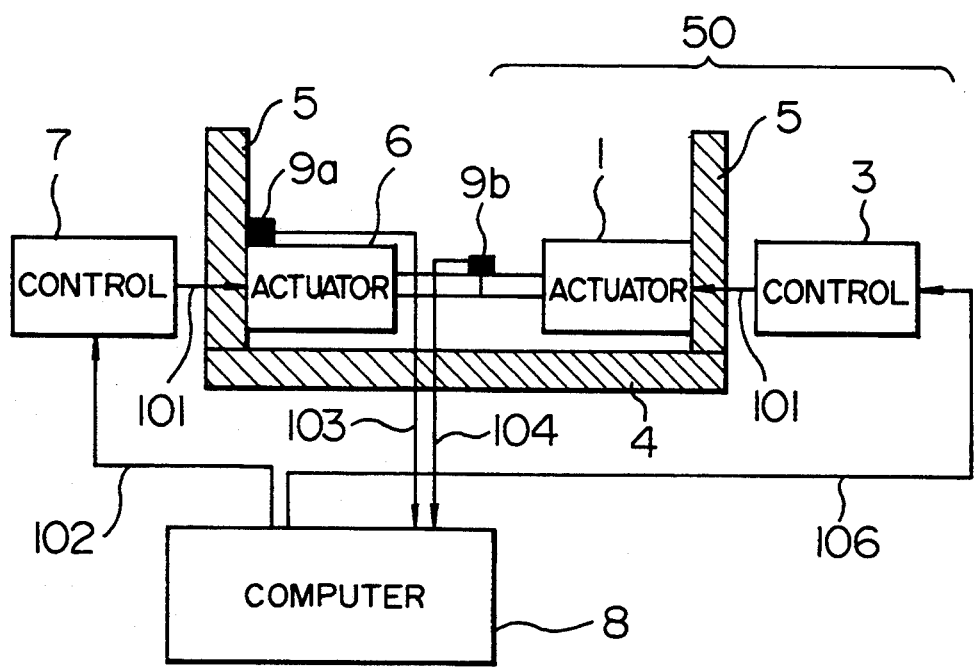
FIG. 4 is an illustration showing a construction of the second embodiment of drive mechanism simulation system according to the invention.

Next, another embodiment will be discussed with reference to FIGS. 3 and 4.

When the controlled object structure 2 is controlled by the controlling drive mechanism 50, a controlling feedback signal becomes necessary on certain occasions. In such cases, a measuring sensor 10 for a feedback signal is employed for inputting the controlling feedback signal 105 to the control unit 3. Either the acceleration, velocity, displacement or the combination thereof may be measured. Also, what is measured may be some other value. In the latter case, in order to perform simulation of the drive mechanism according to the present invention, a necessary value among the foregoing results of calculation in the computer 8 is output to the control unit 3 of the drive mechanism as the simulated controlling feedback signal 106, as shown in FIG. 4.

According to the shown embodiment, even for the drive mechanism, for which obtaining the feedback signal from the controlled object structure 2 is essential, simulation of the drive mechanism can be performed without using the actual controlled object structure.

Figure 5:
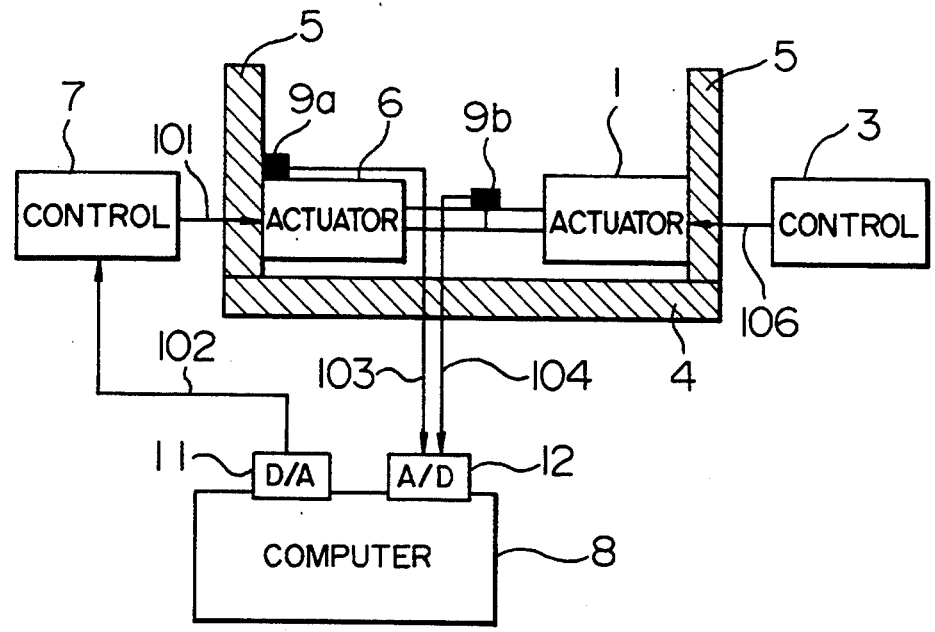
FIG. 5 is an illustration showing a construction of the third embodiment of a drive mechanism simulation system according to the invention.

A further embodiment will be discussed with reference to FIG. 5.

The shown embodiment employs a digital computer as the computer 8 for the simulation system. The signals 103 and 104 from the measuring device 9a and 9b, respectively are analog signals input to the computer 8 via an A/D converter 12. On the other hand, the control signal is output as an analog signal via a D/A converter 11. Accordingly the measuring equipment may output the results of measurement as analog values. Therefore, conventional measuring equipment can be utilized.

A still further embodiment will be discussed with reference to FIG. 6.

Figure 6:
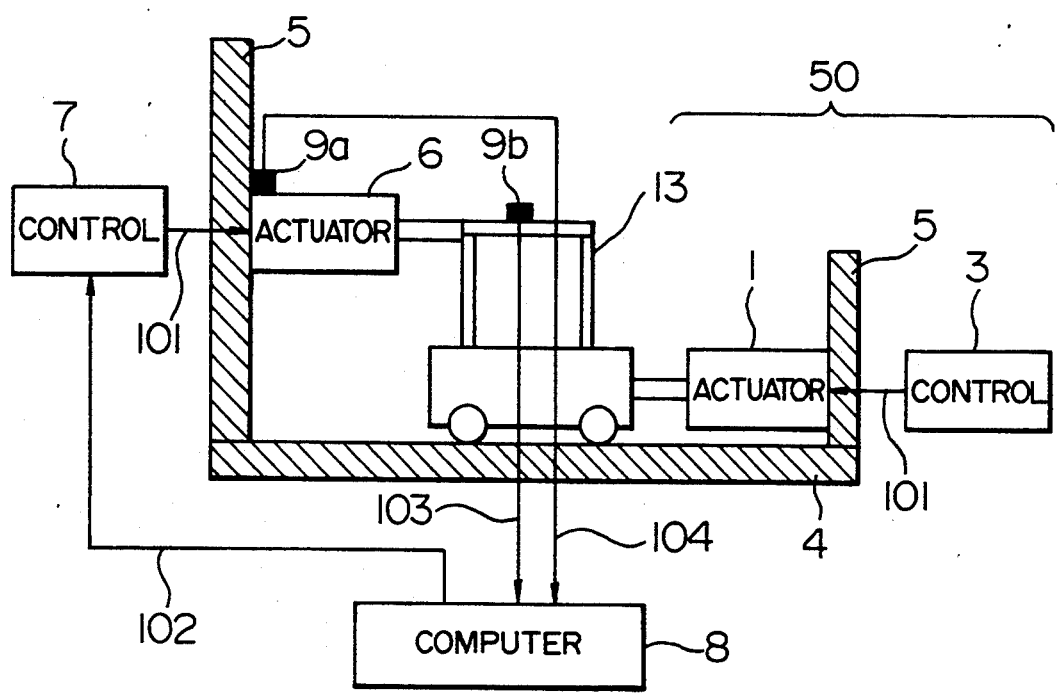
FIG. 6 is an illustration showing a construction of the fourth embodiment of a drive mechanism simulation system according to the invention.

Although the reaction force simulating actuator 6 is directly connected to the driving actuator 1 in the former embodiments, only part of the controlled object structure 2, two upper elements of the structure 2 for example, may be established as the numerical model, and the actuator 6 may be provided at the boundary between the numerical model portion and the other portion 13 of the structure 2, as shown in FIG. 6. The manner of numerical analysis and so forth is the same as those in the former embodiments.

According to the shown embodiment, when there is a portion that is difficult to establish as a numerical model, due to non-linearity and so forth, in the controlled object structure 2, the actual structure can be used at such portion so as to avoid an error in establishing the numerical model. Also, when the reaction force simulating actuator 6 is difficult to be secured to the driving actuator 1, testing of the drive device according to this embodiment becomes possible to implement.

Figure 7:
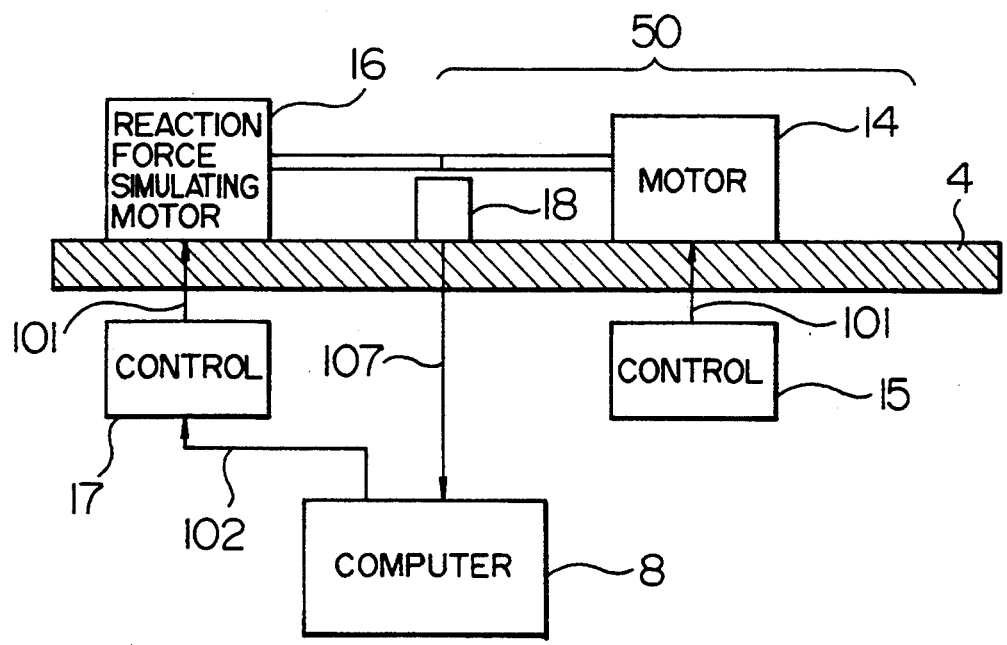
FIG. 7 is an illustration showing a construction of the fifth embodiment of a drive mechanism simulation system according to the invention.

A yet further embodiment will be discussed with reference to FIG. 7.

The shown embodiment shows application of the present invention to rotary equipment. The driving motor 14 and its control unit 15 for controlling the rotary equipment are connected to a reaction force simulating motor 16. The reaction force simulating motor 16 is controlled by a control unit 17. The digital computer calculates a torque applied to the driving motor from the controlled object structure after a given period of time by using a value 107 measured by measuring equipment 18, such as rotation at the connecting point or so forth, and a known external force, and by employing a preliminarily input numerical model of the controlled object structure, and outputs a control signal 102 to the control unit 17 for realizing the calculated torque by the reaction force simulating motor.

The numerical calculation method is substantially the same as those discussed above, except that angular acceleration, angular velocity and rotational angle are used in place of the acceleration, velocity and displacement, the load is the torque, and the mass, damping and stiffness are converted correspondingly.

With the shown embodiment, the present invention becomes applicable for rotary equipment.

A yet further embodiment will be discussed with reference to FIGS. 8 and 9.

Figure 8:
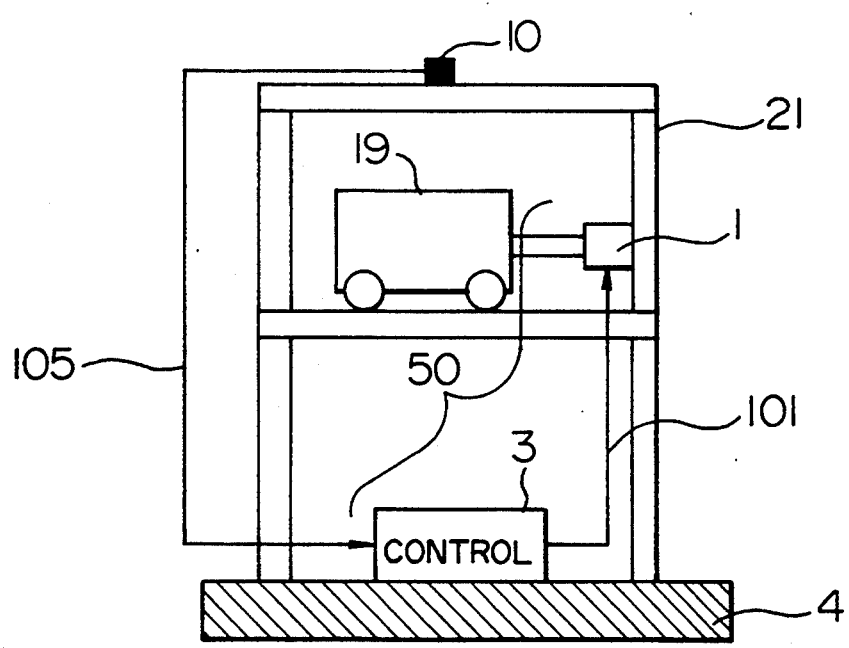
FIG. 8 is a diagrammatic illustration showing a further example of a relationship between a controlling drive mechanism and a controlled object structure.

FIG. 8 is a diagrammatic illustration of a building, in which an active mass damper is installed. By driving a mass 19 by the actuator 1 to provide a reaction force to the building 21, vibration of the building 21 can be suppressed. Normally, in the building, an accelerometer is provided as the measuring sensor 10 for providing the feedback signal for measuring acceleration. The measured value 105 of the accelerometer is input to the control unit 3. The control unit 3 derives the control amount based on the measured value 105. In this case, the building 21 becomes the controlled object structure together with the mass 19. Then, in order to calculate the vibration response of the building 21, the reaction force against the actuator becomes necessary in addition to the acceleration, velocity and displacement of the connecting point.

Figure 9:
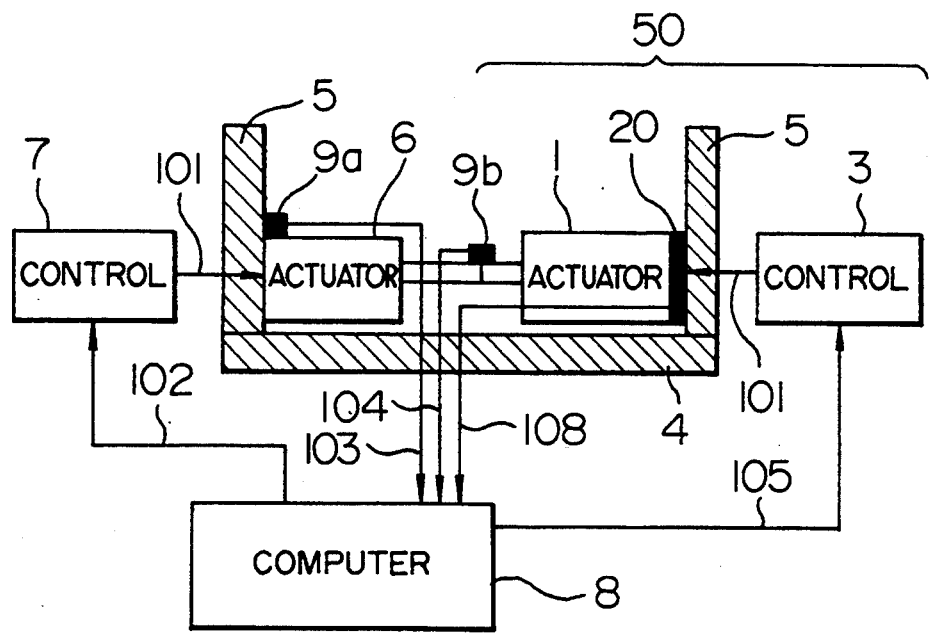
FIG. 9 is an illustration showing a construction of the sixth embodiment of a drive mechanism simulation system according to the invention.

Therefore, as shown in FIG. 9, the load measuring equipment 20 is provided for measuring the reaction force transmitted to the reaction wall 5 via the actuator 1 from the mass 19.

With the shown embodiment, the present invention is applicable even when the reaction force applied to the drive device influences the motion of the controlled object structure.

Next, an embodiment of the digital computer will be discussed.

It should be appreciated that, in the disclosure, the wording "computer" is used include an analog computer, and further includes a calculating portion (CPU or analog circuit) and an input and output portion. "Input" is the measured value and "output" is the result of calculation. On the other hand, the digital computer includes CPU and the input and output portion.

Figure 10:
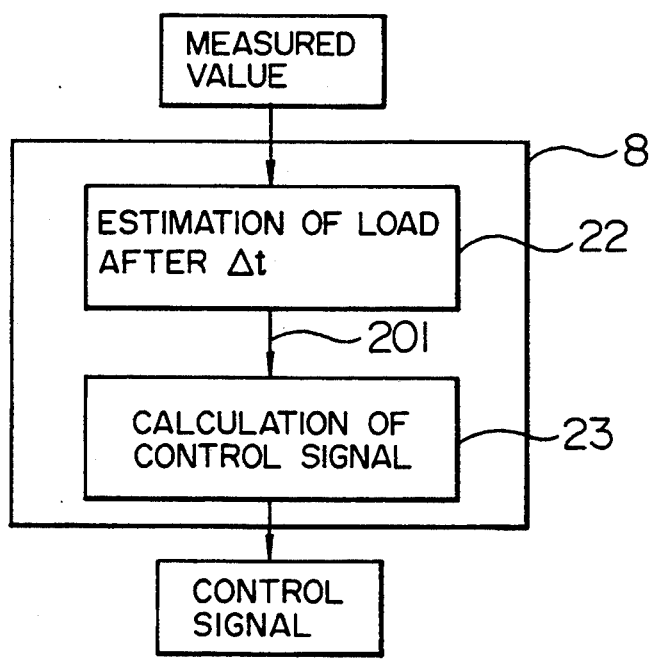
FIG. 10 is an explanatory illustration showing one example of construction of a digital computer to be employed in the present invention.

FIG. 10 shows a digital parallel computer employing a plurality of CPU as the computer 8. At least one of the CPUs 22 performs calculation for a reaction force 201 after a given period by terms of the measured value and the external force, namely calculation for a load after $\Delta t$. At least one of other CPUs 23 performs calculation of the control signal utilizing the result of the calculation of 201 and derives the control signal for outputting.

Figure 11:
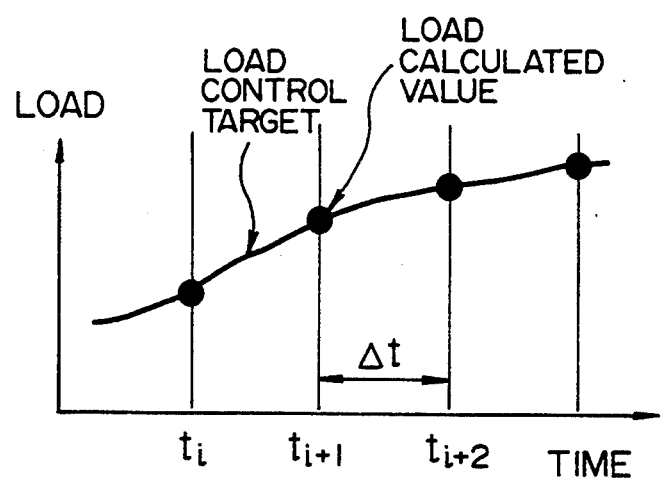
FIG. 11 is an explanatory illustration showing an example of an output method of a load control signal.

The calculated value of the load is calculated every $\Delta t$. It is desirable to make a controlling target of the load smooth, as shown in FIG. 11. Therefore, the period for calculating the control signal is made smaller than $\Delta t$. However, if the interval $\Delta t$ per se is sufficiently small, the interval of calculation of the control signal can be $\Delta t$.

According to the shown embodiment, since the calculations of the digital computer can be performed in parallel, a necessary calculation for one step can be made smaller to shorten the interval Δt and thus increase the accuracy of the test.

Figure 12:
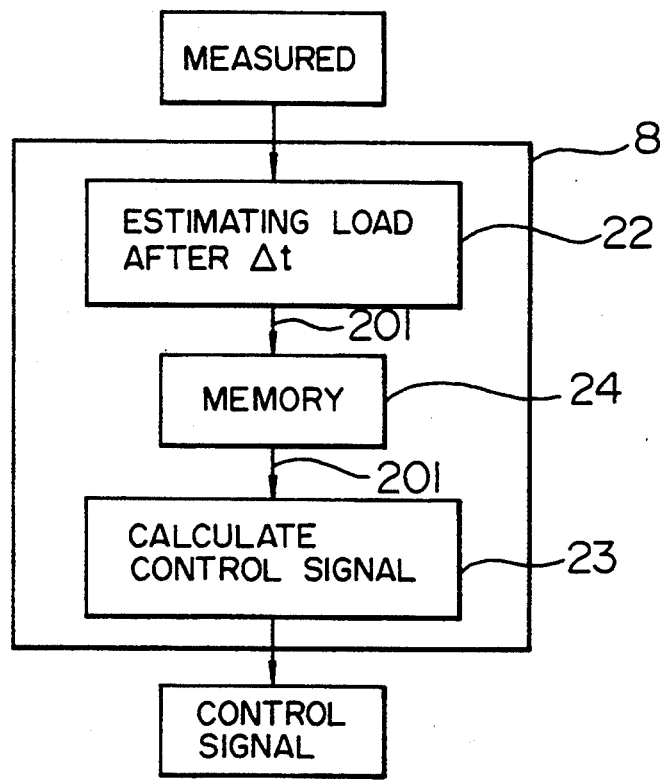
FIG. 12 is an explanatory illustration showing another example of construction of a digital computer to be employed in the present invention.

Another embodiment will be discussed with reference to FIG. 12. In this embodiment, data transfer between the CPU 22 for calculating the vibration response and the CPU 23 for deriving the control signal is performed via a memory 24 which is accessible by both of the CPUs.

With the shown embodiment, independence of CPUs 22 and 23 is increased for improving efficiency of calculation processes.

Figure 13:
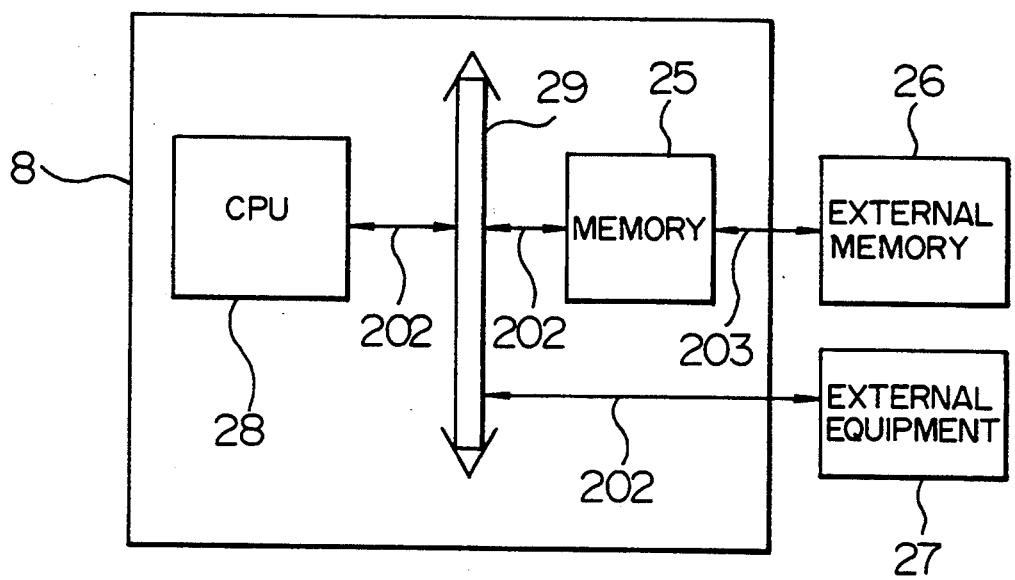
FIG. 13 is an explanatory illustration showing a further example of construction of a digital computer to be employed in the present invention.

A further embodiment will be discussed with reference to FIG. 13. This embodiment provides a memory capable of storing the results of calculation by the digital computer 8 for processing after testing. Namely, the result of calculation 202 by a CPU 28 is transferred to an internal memory 25 of the computer via a data bus 29 and stored therein. The stored data 203 may be transferred to an external memory 26 as necessary. After testing, the stored data is processed by the CPU 28 and output to an external device 27 if necessary.

With this embodiment, a detailed study for the performance of the drive device can be done after testing.

Figure 14:
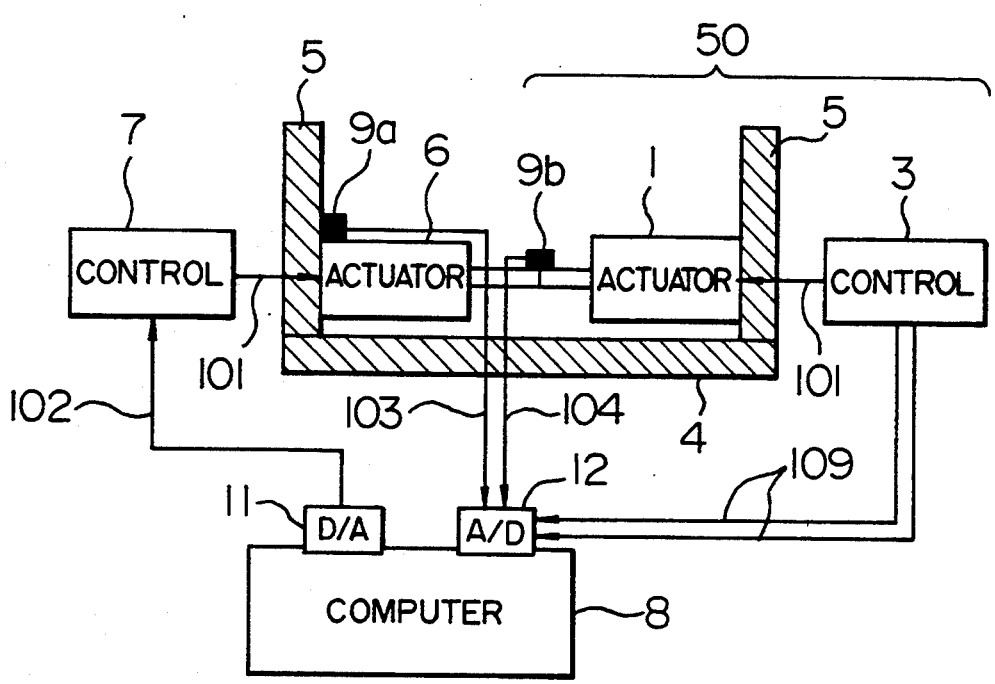
FIG. 14 is an illustration showing a construction of the seventh embodiment of a drive mechanism simulation system according to the invention.

A still further embodiment will be discussed with reference to FIG. 14. In this embodiment, in addition to the results of the numeric calculation as in the former embodiment, but also a signal 109 (such as feedback signal and so forth) from the controlling drive device is input via the A/D converter 12 and stored in the memory for processing after testing.

With the shown embodiment, a detailed study for the performance of the drive device can be done after testing. In addition, it becomes possible to study the control system of the drive device.

Figure 15:
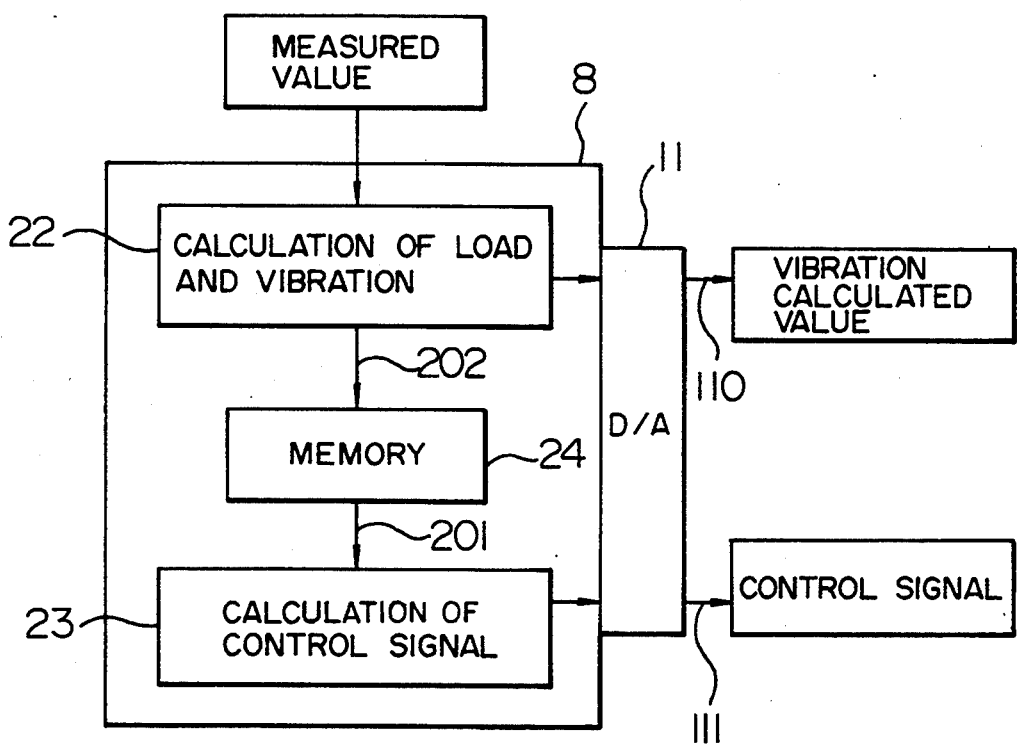
FIG. 15 is an explanatory illustration showing a still further example of construction of a digital computer to be employed in the present invention.

A yet further embodiment is illustrated in FIG. 15. This embodiment is adapted to output not only the control signal but also the results of numeric calculation by the D/A converter 11, for example.

Accordingly, the response of the controlled object structure can be seen during testing. Therefore, the test can be monitored so that the test can be interrupted occasionally. Also, by employing a conventional data recording device, a testing process similar to that performed by setting the sensor in an actual controlled object structure can be performed.

Figure 16:
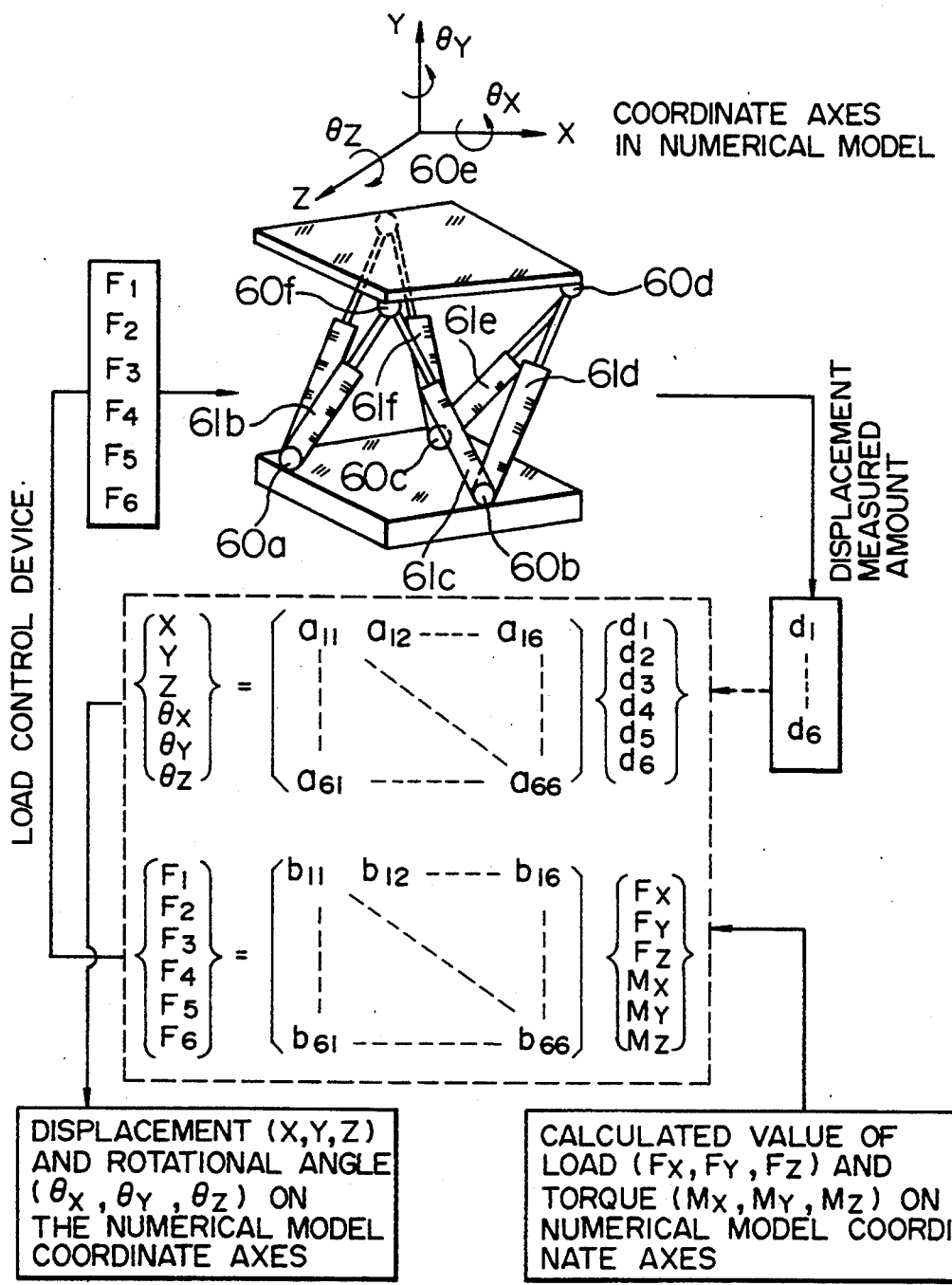
FIG. 16 is an explanatory illustration showing one example of an actuator applicable for the present invention.

It should be appreciated that although the foregoing embodiments employ actuators of one degree of freedom, the invention is not so limited. By employing an actuator having multiple degrees of freedom corresponding to the degrees of freedom at the boundary of the controlled object structure established as the numerical model, any degree of freedom is applicable for implementing the present invention. For instance, with the construction as shown in FIG. 16, a six-degree-of-freedom actuator can be constructed.

Figure 17:
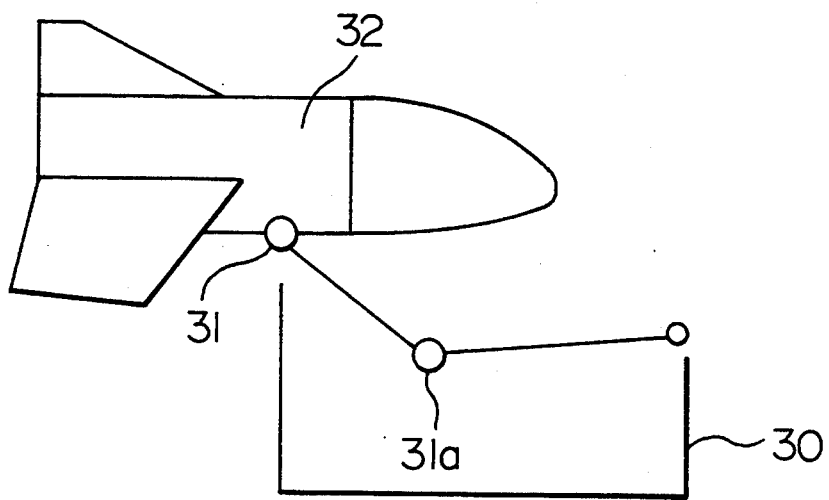
FIG. 17 is an explanatory illustration showing a still further example of construction of a digital computer to be employed in the present invention.

Next, the embodiment, in which the present invention is applied to equipment to be used in space, will be discussed with reference to FIGS. 17 and 18. A manipulator 30 to be used in space is driven by actuators 31 and 31a. When actuator 31 is driven, a reaction force is transmitted to a spaceship 32 via actuator 31 to initiate motion of overall structure including the spaceship 32.

For performing a test for such system on earth, in order to avoid the influence of the gravity or air resistance, the structure is hung by means of a wire for canceling the effect of gravity, or the test is performed in a vacuum chamber for eliminating the influence of air resistance. However, in such a testing facility, the motion of the equipment is limited to two dimensional space, or in a limited space to make it difficult to realize the actual usage condition.

Figure 18:
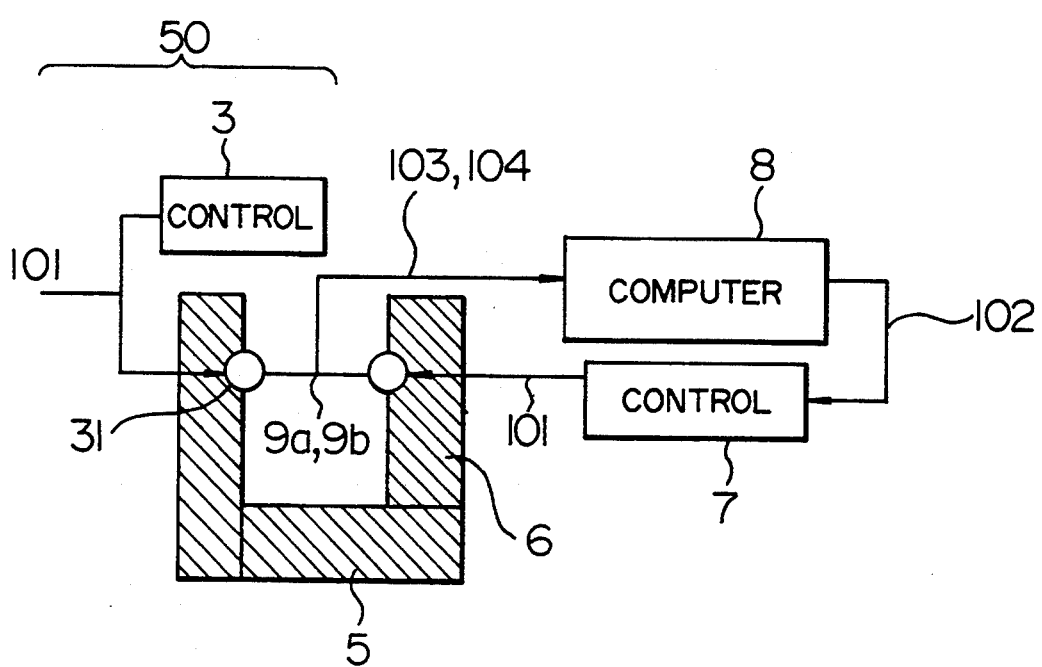
FIG. 18 is an illustration showing a construction of the eighth embodiment of drive mechanism simulation system according to the invention.

Therefore, as shown in FIG. 18, by replacing the manipulator portion with the reaction force simulating actuator, the drive device is tested in a vacuum and under weightless conditions. At this time, by using the load acting on the reaction wall from the actuator in the numeric calculation, evaluation of the overall system including the spaceship becomes possible. Also, when another actuator 31a is present within the manipulator 30 as shown in FIG. 17, another test system portion of the actuator as shown in FIG. 18 is established to simultaneously perform calculation and control for two actuators by the digital computer 8.

Figure 19:
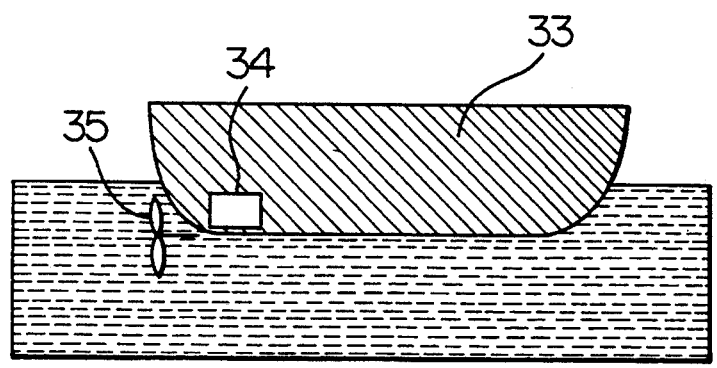
FIG. 19 is an explanatory illustration showing yet a further example of construction of a digital computer to be employed in the present invention.
Figure 20:
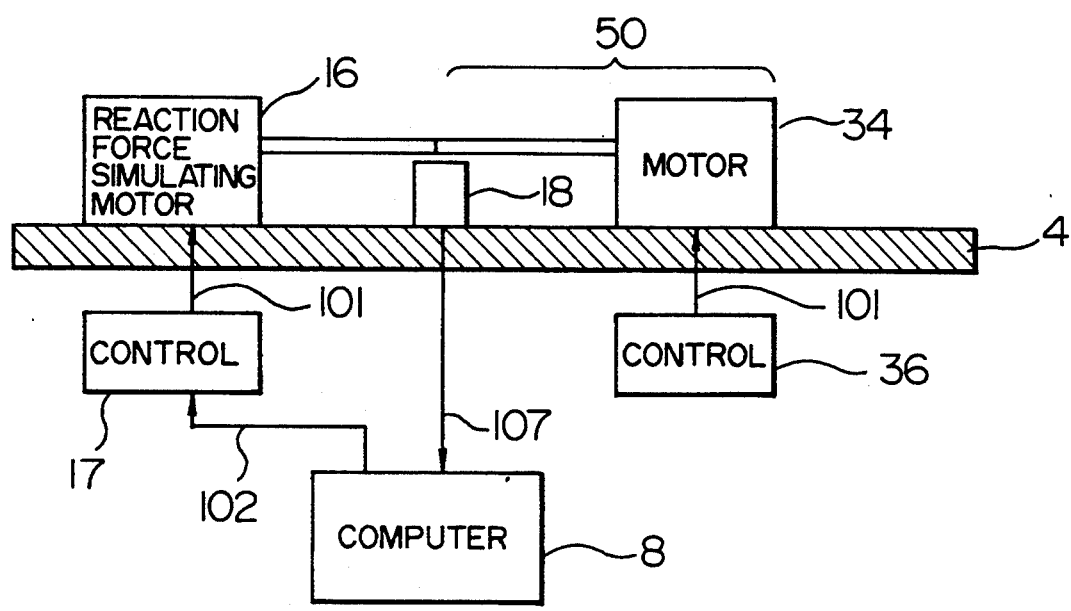
FIG. 20 is an illustration showing a construction of the ninth embodiment of a drive mechanism simulation system according to the invention.

An embodiment, in which the present invention is applied to a screw and an engine as a propulsion device of a ship is illustrated in FIG. 19 and 20. As shown in FIG. 19, the ship 33 is propelled by the screw 35 rotatingly driven by the engine. However, in case of a large size ship, it is difficult to perform a performance test using the ship body and the large screw. Therefore, as shown in FIG. 20, by connecting a motor 35 simulating the resistance in place of the screw, a test under substantially equal conditions to the actual condition can be performed.

It should be noted that the present invention should not be limited to the foregoing embodiments but is applicable for various objects with various constructions without departing from the principle of the invention.

What is claimed is:

1. A drive mechanism simulation system for simulating a drive mechanism for a structure, comprising:
    a first actuator, fixed to a first rigid wall, for evaluating a reaction force from said structure;
    a second actuator, fixed to a second rigid wall that is connected to the first rigid wall and connected to said first actuator for actuating said first actuator in a same direction of actuation as that of said first actuator;
    a first controller for controlling said first actuator in a predetermined manner with displacement, velocity and acceleration;
    a second controller for controlling said second actuator in a predetermined manner with displacement, velocity and acceleration;
    a first sensor, mounted in the vicinity of a connecting point between said first actuator and the first rigid wall, for measuring at least one of the displacement, the velocity and acceleration;
    a second sensor mounted in the vicinity of a connecting point between said first and second actuators, for measuring at least one of the displacement, the velocity and the acceleration; and
    a computer for storing a mathematical model for said structure and providing a control output to said second controller on the basis of an output of said first and second sensors, to thereby estimate the reaction force from said structure after a predetermined time.

2. A drive mechanism simulation system as set forth in claim 1, further comprising:
    a D/A converter for receiving said control output calculated by said computer and performing D/A conversion thereto.

3. A drive mechanism simulation system as set forth in claim 1, further comprising:

an A/D converter for receiving measured values by said first and second sensors and performing A/D conversion.

4. A drive mechanism simulation system as set forth in claim 1, wherein said computer comprises:
means for storing parameters representative of a predetermined equation group, for calculating one parameter with respect to said mathematical model using the outputs of said first and second sensors;
means for calculating a displacement response of said mathematical model after a given period of time using the outputs of said first and second sensors; and
means for calculating a reaction force applied from said second actuator to said first actuator in the vicinity of the connecting point between said first and second actuators using the displacement response.

5. A drive mechanism simulation system as set forth in claim 1, wherein an actual model representing a fraction of said structure is mounted between said first and second actuators and said first and second sensors are mounted on said actual model.

6. A drive mechanism simulation method for simulating a drive mechanism for a structure, said method comprising the steps of:
evaluating a reaction force from said structure, using a first actuator;
connecting a second actuator to said first actuator for actuating said structure in a same direction of actuation as that of said first actuator;
connecting other ends of said first and second actuators to first and second rigid walls, respectively, said first and second rigid walls being connected together;
controlling said first actuator in a predetermined manner with displacement, velocity and acceleration;
controlling said second actuator in a predetermined manner with displacement, velocity and acceleration;
measuring, using a sensor, at least one of the displacement, the velocity and acceleration in the vicinity of a connecting point between said first and second actuators; and
storing into a computer a mathematical model for said structure and providing a control output based on an output of said sensor for controlling said second actuator.

7. A simulation method as set forth in claim 6, wherein said computer is a digital computer including an A/D converter, and a D/A converter, and transfer of data between said digital computer and other equipment is performed in a form of analog signal input and output via said A/D converter or said D/A converter.

8. A drive mechanism simulation method as set forth in claim 6, further comprising the steps of:
storing parameters representative of a predetermined equation group;
calculating one parameter with respect to said mathematical model using the output of said sensor;
calculating a displacement response of said mathematical model after a given period of time using the output of said sensor; and
calculating a reaction force applied from said second actuator to said first actuator in the vicinity of the connecting point between said first and second actuators using said displacement response.

9. A simulation method for a drive mechanism provided on a controlled object structure for controlling displacement, velocity and/or acceleration at one or more points on said structure, said method comprising the steps of:
connecting one or more actuators at a common boundary, said actuators being provided in a same direction of actuation opposite that of said drive mechanism;
inputting a numerical model of said structure to a computer;
measuring actuating conditions of said one or more actuators;
inputting said measured actuating conditions to said computer;
calculating a load to be generated at said boundary after a given period of time for measuring said actuating conditions, by said computer using said numerical model; and
outputting control signals to a control device of said actuators for realizing said calculated load after said given period of time.

10. A simulation method as set forth in claim 9, wherein said computer is a digital computer including an A/D converter, and a D/A converter, and transfer of data between said digital computer and other equipment is performed in a form of analog signal input and output via said A/D converter or said D/A converter.

11. A simulation method as set forth in claim 10, wherein said digital computer receives input of the signal concerning said drive mechanism via said A/D converter and stores the input signal together with said calculated value of the load and said the calculated value of motion.

12. A simulation method as set forth in claim 9, further comprising the steps of:
measuring a reaction force from said drive mechanism, said reaction force being generated at a fixing point of said drive mechanism; and
using measured values of displacement, velocity and/or acceleration as actuating condition of said actuator, a known external term and said calculated value of said load for calculating the load after said given period.

13. A simulation method as set forth in claim 9, wherein said computer calculates a controlling feedback signal providing data obtained from either said controlled object structure or measuring equipment mounted thereon while said drive mechanism is being used, said controlling feedback signal is then output to said drive mechanism.

14. A simulation method as set forth in claim 9, further comprising the steps of:
connecting an actual structure model as a fraction of said controlled object structure between said drive mechanism and said actuator;
establishing a numerical model of remaining fraction of said controlled object structure; and
providing said actuator at the boundary between said actual model and said numerical model.

15. A simulation method as set forth in claim 9, wherein the values to be controlled by said drive mechanism are rotational angle, angular velocity and/or angular acceleration of a rotating element of said controlled object structure, the values to be measured as the actuating condition of said actuator are rotational angle, angular velocity and/or the angular acceleration, and a value to be calculated by said computer and to be realized by the associated actuator is torque.

16. A simulation method as set forth in claim 15, wherein said computer is a digital computer including an A/D converter, and a D/A converter, and transfer of data between said digital computer and other equipment is performed in a form of analog signal input and output via said A/D converter or said D/A converter.

17. A simulation method for a drive mechanism controlling displacements, velocities and/or accelerations at a plurality of points of a controlled object structure, said drive mechanism being provided on said structure, said method comprising the steps of:

providing an actuator other than said drive mechanism at a boundary point between said drive mechanism and said structure, on which said drive mechanism is provided;

inputting a control signal to be output from a computer to a control device for said actuator, said computer calculating a load to be generated at the boundary after a given period of time by employing a numerical model input thereto using measured values of displacement, velocity and/or acceleration; and repeating outputting of said control signal to said control device for said actuator to realize the calculated load after the given period of time for measuring said measured values.

18. A simulation method as set forth in claim 17, wherein the control signal to be obtained from said controlled object structure or measuring equipment provided thereon is output to said drive mechanism by said computer.

19. A simulation method as set forth in claim 17, wherein said computer has functions for A/D conversion and D/A conversion, and transfer of said between said computer and other equipment.

20. A drive mechanism simulation system for simulating a drive mechanism for a structure, comprising:

a second actuator fixed to a first rigid wall and connected to a first actuator fixed to another rigid wall linked to the first rigid wall, for evaluating a reaction force from said structure, for actuating a structure so as to have an opposite actuation direction with said first actuator;

a first controller for controlling said first actuator in a predetermined manner with displacement, velocity and acceleration;

a second controller for controlling said second actuator in a predetermined manner with displacement, velocity and acceleration;

a sensor, mounted in the vicinity of the connecting point between said first and second actuators, for measuring at least one of the displacement, the velocity and the acceleration;

a computer storing a mathematical model for said structure and providing a control output using the output of said sensor, said control output being output to said second controller to thereby estimate the reaction force from said structure expected after a predetermined amount of time.

* * * * *